United States Patent [19]

Arai

[11] Patent Number: 4,594,388
[45] Date of Patent: Jun. 10, 1986

[54] METHOD OF MANUFACTURING SHAPED ARTICLES WITH EXCELLENT HEAT RESISTANCE AND ADHESIVENESS TO RUBBER FROM A COMPOSITION COMPRISING POLYESTER AND EPOXIDIZED POLYBUTADIENE AND ADHERING SAID ARTICLES TO RUBBER

[75] Inventor: Yoshihiro Arai, Joyo, Japan
[73] Assignee: Unitika Limited, Osaka, Japan
[21] Appl. No.: 646,039
[22] Filed: Aug. 30, 1984

Related U.S. Application Data

[63] Continuation of Ser. No. 455,176, Jan. 3, 1983, abandoned.

[30] Foreign Application Priority Data

Jul. 14, 1982 [JP] Japan .................. 57-123303

[51] Int. Cl.$^4$ .................. C08L 9/00; C08L 15/00; C08L 67/02
[52] U.S. Cl. .................. 525/177; 525/438
[58] Field of Search .................. 525/438, 176, 177

[56] References Cited

U.S. PATENT DOCUMENTS

| | | | |
|---|---|---|---|
| 3,027,279 | 3/1962 | Kurka et al. | 525/438 |
| 3,449,200 | 6/1969 | Kalafus et al. | 525/438 |
| 4,076,767 | 2/1978 | Samejima | 525/438 |
| 4,246,378 | 1/1981 | Kometani et al. | 525/438 |

OTHER PUBLICATIONS

Lee et al., "Handbook of Epoxy Resins", McGraw-Hill Book Company, Mar. 1967, pp. 15-6 and 15-7.

*Primary Examiner*—Allan M. Lieberman
*Attorney, Agent, or Firm*—Richard A. Anderson

[57] ABSTRACT

This invention is a method of manufacturing polyesters with excellent heat resistance and adhesiveness to rubber, characterized in that 0.2-5 weight percent epoxidized polybutadiene is reacted with a polyester composed of aromatic dicarboxylic acid and a glycol ingredient with a carbon number of 2-6, and the terminal carboxyl group quantity is made 15 grams equivalent per $10^6$ grams polymer or less.

7 Claims, No Drawings

METHOD OF MANUFACTURING SHAPED ARTICLES WITH EXCELLENT HEAT RESISTANCE AND ADHESIVENESS TO RUBBER FROM A COMPOSITION COMPRISING POLYESTER AND EPOXIDIZED POLYBUTADIENE AND ADHERING SAID ARTICLES TO RUBBER

This application is a continuation of application Ser. No. 455,176 filed Jan. 3, 1983, now abandoned.

BACKGROUND OF THE INVENTION

This invention relates to a method of manufacturing polyesters with excellent heat resistance and adhesiveness to rubber and with reduced terminal carboxyl groups.

It is well known that reducing the terminal carboxyl groups (abbreviated "(COOH)" in the following) is effective in improving the heat resistance of polyesters, that is, their resistance to hydrolysis and amine decomposition at high temperatures. Various methods of reducing the (COOH) of polyesters have been proposed, but the most representative example of these methods is that of reacting polyesters and epoxy compounds (Japanese Public Patent Disclosure No. Showa 54 [1979] 6051). However, when the inventors investigated this method it was found that although the (COOH) of the polyester is reduced by adding the epoxy compound, there is also the problem that the degree of polymerization is lowered. On the other hand, concerning methods of improving adhesiveness between polyesters and rubber, various proposals have been made for modifying the rubber, etc., but it has been found that they have many problems, including their effectiveness, the complexity of their performance, etc.

DESCRIPTION OF THE INVENTION

The inventors have conducted careful research on solving these two problems simultaneously and as a result have discovered that it is suitable to react the polyester with epoxidized polybutadiene; thus they arrived at this invention.

That is, this invention is essentially a method of manufacturing polyesters with excellent heat resistance and adhesiveness to rubber, characterized in that a polyester composed of an aromatic dicarboxylic acid and a glycol ingredient with a carbon number of 2–6 is reacted with 0.2–5 weight percent epoxidized polybutadiene, and the (COOH) content is reduced to 15 grams equivalent per $10^6$ grams polymer or less.

"Polyester" in this invention means a polycondensate of an aromatic dicarboxylic acid and a glycol with a carbon number of 2–6. Its type is not particularly restricted. Either hompolymers or copolymers are usable. The method of polycondensing the polymer can be a conventional method, without change.

The epoxidized polybutadiene in this invention may be any of those expressed by the formulas (1) and (2) below:

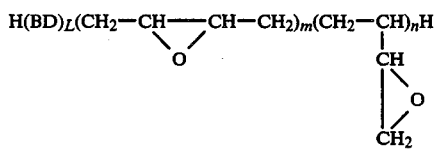

(1)

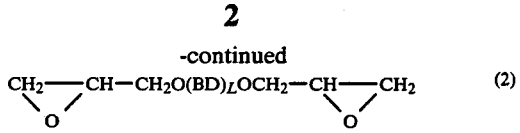

(2)

where BD in the formula means a butadiene unit which may have substituents the microstructure of which contains one or more trans 1,4, cis 1,4 and vinyl 1,2 bonds; L is a number from 1 to 100; and m and n are numbers such that (m+n) is 1–50.

As concrete examples, the commercial epoxidated polybutadienes below may be given.

Type (1)

(A) EP-LCB-30 (Nippon Zeon Company)
 Number average molecular weight: 1700
 Iodine number: 320 (grams $I_2$/100 grams)
 Epoxy equivalent: 260
 Microstructure—Cis 1,4: 74%, Trans 1,4: 25%, Vinyl 1,2: 1%.

(B) Poly bd R-45 EPI (Idemitsu Petrochemical Company)
 Number average molecular weight: 2800
 Iodine number: 305 (grams $I_2$/100 grams)
 Epoxy equivalent: 200
 Microstructure—Cis 1,4: 20%, Trans 1,4: 60%, Vinyl 1,2: 20%.

(C) NISSO PB-BF (Nippon Soda Company)
 Number average molecular weight: 1000
 Iodine number: 280 (grams $I_2$/100 grams)
 Epoxy equivalent: 182
 Microstructure—Vinyl 1,2: 90%, Trans 1,4: 10%.

Type (2)

(A) Poly bd R-45-EPT (Idemitsu Petrochemical Company)
 Number average molecular weight: 2800
 Iodine number: 470 (grams $I_2$/100 grams)
 Epoxy equivalent: 1450
 Microstructure—Cis 1,4: 20%, Trans 1,4: 60%, Vinyl 1,2: 20%.

The quantity of epoxidized polybutadiene with respect to the polyester is 0.2–5 weight percent. If this quantity is too small, the degree of reduction of the (COOH) is low; conversely, when it is too great, the reaction proceeds fully, but gelation of the polyester and other undesirable problems are caused.

The reaction of the polyester and the epoxidized polybutadiene is performed by adding the epoxidized polybutadiene at the stage after the intrinsic viscosity of the polyester has reached 0.50; ordinarily, it is performed at a temperature at or above the melting temperature of the polyester, and requires three minutes or more. The intrinsic viscosity here is measured at 20° C. using a phenol/tetrachloroethane (1/1 weight/weight) mixed solvent. It is necessary, of course, that the atmosphere (in the vessel) at the time of the reaction be made up of a nitrogen or another inert gas, or that active gases which promote the decomposition of the polyester, such as oxygen, be excluded by some other method; also, the reaction should be performed while stirring. The epoxidized polybutadiene may be added and mixed before completion of the polycondensation reaction of the polyester in its molten state or after the polymerization is completed, mixing it with the molten polyester and melt spinning, or melt spinning and reacting after mixing with the polymer in a granular, solid form. The reaction proceeds without a catalyst, but a suitable catalyst may also be added.

The (COOH) content of the polyester is reduced by the addition of this epoxidized polybutadiene, and since the epoxy group is bifunctional or more, the desirable result is produced that the reduction in the degree of polymerization of the polymer is small, and the polyester molecule chain is, rather, linked by the epoxy group of the epoxidized polybutadiene so that the degree of polymerization is increased.

Also, a butadiene unit is introduced into the polyester by the reaction between the polyester and the epoxidized polybutadiene, and the affinity between the dip solution and the rubber ingredients, at the time of the dip treatment and the adhesion with the rubber, is increased. In this way, the desirable result is produced that the adhesiveness with rubber is improved.

Thus, by reacting 0.2–5 weight percent epoxidized polybutadiene with the polyester, and reducing the (COOH) to 15 gram equivalent per $10^6$ grams polymer or less, the reduction in the (COOH) quantity accomplishes an improvement in the heat resistance, and at the same time the introduction of the butadiene unit accomplishes an improvement in the adhesiveness with rubber.

Of course, it is also possible to add other additives in obtaining the polyester of this invention for the sake of other purposes.

The final form of the polyester of this invention may be fiber, film, or other molded forms, etc.

The polyester with reduced (COOH) obtained by the method of this invention has greatly improved thermal stability, i.e., resistance to hydrolysis and amine decomposition at high temperatures, and also becomes superior in its adhesiveness to rubber. Its increase in practical value in terms of increased performance in conventional uses, rationalization of the process and making possible new uses in fields where it was not conventionally used, etc., is very great.

Below, this invention will be explained concretely by practical examples.

ACTUAL EXAMPLE 1

Epoxidized polybutadiene EP-LCB-30, 0.8 weight percent, was blended with polyethylene terephthalate chips with an intrinsic viscosity of 0.73 and a (COOH) content of 24 grams equivalent per $10^6$ grams polymer, obtained by the usual method from terephthalic acid and ethylene glycol. This blend was spun using a spinnerette with 192 holes 0.5 mm in diameter. The spinning conditions were: temperature 300° C.; residence time 5–15 minutes; quantity emitted 300 grams per minute; and winding rate 317 m/minute. The yarn obtained was 8520 d/192 filaments. The undrawn yarn obtained was drawn 3.8 fold at 90° C. in the first stage; in the second stage it was drawn 1.5 fold at 200° C. Next, heat treatment was performed under tension at 220° C.; and a drawn yarn of 1500 d/192 filaments was finally obtained. The intrinsic viscosity of this drawn yarn was 0.95, and the (COOH) was 12 gram equivalent per $10^6$ grams polymer.

The drawn yarn obtained was first Z twisted at 40 T/10 cm and then, after two yarns were put together, they were S twisted at 40 T/10 cm to obtain a raw cord of 1500 d×2. This raw cord was immersed in a one-bath type adhesive solution (Pexul (product of ICI Company) RFL solution). After a tension of 1.0 kg per cord was applied, heat treatment at 240° C. was applied for three minutes to produce the treated cord. This treated cord was measured for its strength; the value obtained was 22.0 kg. Next the adhesive force of the treated cord was evaluated by the H-test. First, test pieces were made by vulcanization pressure adhesion at 150° C., 100 kg/cm², for 30 minutes. The result of measuring the adhesive force was 19.0 kg. Next, in order to obtain the heat resistance strength, samples made under the vulcanization conditions of 170° C., 100 kg/cm², and 75 minutes were measured; the value was 7.6 kg. The results are shown in Table 1.

COMPARISON EXAMPLE 1

The same operations as in Actual Example 1 were repeated, except that the epoxidized polybutadiene was not added. The values of the various characteristics of the drawn yarn and the treated cord are shown in Table 1. The (COOH) was not reduced, and the values of the adhesive force and the heat resistance strength were found to be low.

ACTUAL EXAMPLES 2, 3 AND 4

The same operations were performed as in Actual Example 1, except that Poly bd R-45 EPI (Actual Example 2), NISSO PB-BF (Actual Example 3), and Poly bd R-45 EPT (Actual Example 4) were used as the epoxidized polybutadiene. Table 1 shows the various characteristic values of the drawn yarn and treated cord made in this way. The (COOH) was reduced, and the adhesive force and heat resistance strength were improved.

COMPARISON EXAMPLES 2 AND 3

The same operations were performed as in Actual Example 1, except that the quantities of epoxidized polybutadiene EP-LCB-30 added were 0.1 weight percent (Comparison Example 2) and 8 weight percent (Comparison Example 3). The characteristic values of the drawn yarn and treated cord produced are shown in Table 1. When the quantity of epoxidized polybutadiene was too small (Comprison Example 2), the amount of reduction of (COOH) was small, and the improvement in heat resistance strength was found to be low. Conversely, when the quantity of epoxidized polybutadiene was too great (Comparison Example 3), the polymer gelled and the yarn spinning was impossible.

COMPARISON EXAMPLE 4

The same operations were performed as in Actual Example 1, except that glycidyl phthalimide was used as a monofunctional epoxy compound, instead of the epoxidized polybutadiene. The characteristic values of the drawn yarn and treated cord made in this way are shown in Table 1. The (COOH) was reduced, but the intrinsic viscosity was also reduced and the strength was reduced to a low level; the adhesive force was also not improved, so that it was found to be undesirable.

COMPARISON EXAMPLE 5

The same operations were performed as in Actual Example 1 except that Epolite 3002 (Soryu Senryo Company) (structural formula

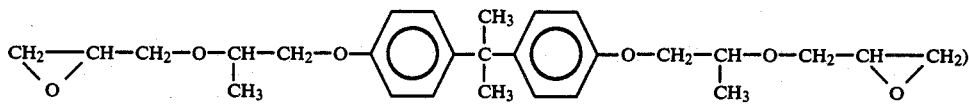

was used as a bifunctional epoxy compound instead of the epoxidized polybutadiene). The characteristic values of the drawn yarn and treated cord made in this way are shown in Table 1. The reduction of (COOH) was small, and no improvement in adhesive strength was observed so that it was found undesirable.

wherein BD in the formula means a butadiene unit which may have substituents, the microstructure of which contains one or more trans 1,4, cis 1,4 and vinyl 1,2 bonds, L is a number from 1 to 100, and m and n are numbers such that (m+n) is 1 to 50; with a polyester composed of an aromatic dicarboxylic acid and glycol ingredient with 2 to 6 carbons so that the resultant polyester has less than 15 gram equivalents of terminal carboxyl groups per $10^6$ grams of polymer, such shaped articles being selected from the group consisting of film and fiber.

TABLE 1

|  | Additive | | Drawn Yarn | | Treated Cord | | |
|---|---|---|---|---|---|---|---|
|  | Compound | Quantity Added (Weight %) | Intrinsic Viscosity | (COOH) Grams/Equivalent/$10^6$ Grams | Adhesive Force kg | Strength kg | Heat Resistance Strength kg |
| Actual Example 1 | EP-LCB-30 | 0.8 | 0.95 | 12 | 19.0 | 22.0 | 7.6 |
| Comparison Example 1 | — | — | 0.70 | 25 | 15.2 | 18.4 | 7.0 |
| Actual Example 2 | Poly bd R-45 EPI | 0.8 | 0.97 | 10 | 19.5 | 22.4 | 8.9 |
| Actual Example 3 | NISSO PB-BF | 0.8 | 0.94 | 12 | 18.1 | 20.2 | 8.5 |
| Actual Example 4 | Poly bd R-45 EPT | 0.8 | 0.90 | 14 | 16.3 | 19.1 | 7.5 |
| Comparison Example 2 | EP-LCB-30 | 0.1 | 0.75 | 19 | 15.1 | 18.2 | 7.1 |
| Comparison Example 3 | EP-LCB-30 | 8.0 | Spinning impossible | Spinning impossible | — | — | — |
| Comparison Example 4 | Glycidyl phthalimide | 0.8 | 0.65 | 5 | 13.2 | 12.1 | 5.0 |
| Comparison Example 5 | Epolite 3002 | 0.8 | 0.66 | 23 | 11.2 | 10.8 | 3.2 |

I claim:

1. In the method of manufacturing shaped articles of polyester and adhering said articles to rubber said articles having excellent heat resistance and adhesion to rubber, the improvement comprising reacting from about 0.2 to about 5 percent by weight of an epoxidized polybutadiene which may be any of those epoxidized polybutadienes expressed by the formulas (1) and (2) below:

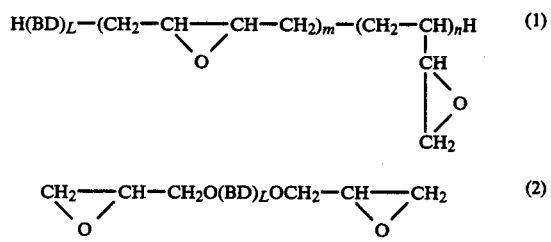

2. The method of claim 1 wherein the shaped article is a fiber.

3. The method of claim 1 wherein the shaped article is film.

4. The method of claim 1 wherein the epoxidized polybutadiene is reacted with molten polyester after the polymer has reached an intrinsic viscosity of 0.5.

5. The method of claim 4 wherein the reaction requires three minutes or more.

6. The method of claim 1 wherein the epoxidized polybutadiene is reacted by mixing with polymer in solid, granular form prior to molten extrusion into a shaped article, whereby the reaction occurs during extrusion.

7. The method of claim 1 wherein a catalyst is also added.

* * * * *